United States Patent
Kamata

(10) Patent No.: US 9,502,920 B2
(45) Date of Patent: Nov. 22, 2016

(54) POWER RECEIVING DEVICE, POWER TRANSMISSION DEVICE, AND POWER FEEDING SYSTEM

(71) Applicant: SEMICONDUCTOR ENERGY LABORATORY CO., LTD., Atsugi-shi, Kanagawa-ken (JP)

(72) Inventor: Koichiro Kamata, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 839 days.

(21) Appl. No.: 13/668,467

(22) Filed: Nov. 5, 2012

(65) Prior Publication Data

US 2013/0119776 A1 May 16, 2013

(30) Foreign Application Priority Data

Nov. 16, 2011 (JP) .................. 2011-250603

(51) Int. Cl.
*H02J 7/02* (2016.01)
*B60L 11/18* (2006.01)
*H02J 7/00* (2006.01)

(52) U.S. Cl.
CPC ............ *H02J 7/025* (2013.01); *B60L 11/182* (2013.01); *H02J 2007/0096* (2013.01); *Y02T 10/7005* (2013.01); *Y02T 10/7072* (2013.01); *Y02T 90/122* (2013.01); *Y02T 90/14* (2013.01); *Y02T 90/16* (2013.01)

(58) Field of Classification Search
CPC .................................. B60L 11/182
USPC ........................................ 307/104
See application file for complete search history.

(56) References Cited

U.S. PATENT DOCUMENTS

| | | |
|---|---|---|
| 9,350,295 B2 | 5/2016 | Kamata |
| 2009/0079268 A1* | 3/2009 | Cook ............ H01Q 1/248 307/104 |
| 2010/0081379 A1* | 4/2010 | Cooper .......... H01Q 1/248 455/41.1 |
| 2011/0018358 A1 | 1/2011 | Kozakai |

(Continued)

FOREIGN PATENT DOCUMENTS

| | | |
|---|---|---|
| EP | 2325037 A | 5/2011 |
| JP | 2001-307032 | 11/2001 |

(Continued)

OTHER PUBLICATIONS

Kurs.A et al., "Wireless Power Transfer via Strongly Coupled Magnetic Resonances,", Science, Jul. 6, 2007, vol. 317, No. 5834, pp. 83-86.

*Primary Examiner* — Thienvu Tran
*Assistant Examiner* — David M Stables
(74) *Attorney, Agent, or Firm* — Nixon Peabody LLP; Jeffrey L. Costellia

(57) ABSTRACT

A novel power receiving device and a novel power transmission device are provided. Power feeding and communication are performed using a magnetic resonance method. Specifically, in one embodiment of the present invention, power feeding is performed by generating a second high-frequency voltage based on a first high-frequency voltage induced in a resonant coil and communication is performed by modulating amplitude of the first high-frequency voltage induced in the resonant coil. Thus, it is possible to perform communication and power feeding based on data obtained by the communication in pseudo-parallel.

13 Claims, 6 Drawing Sheets

(56) References Cited

U.S. PATENT DOCUMENTS

| | | |
|---|---|---|
| 2011/0187321 A1 | 8/2011 | Hirayama |
| 2011/0266880 A1* | 11/2011 | Kim .................. H02J 7/025 307/104 |
| 2011/0309689 A1 | 12/2011 | Kamata |
| 2012/0025611 A1 | 2/2012 | Kamata et al. |
| 2012/0025627 A1 | 2/2012 | Shionoiri et al. |
| 2012/0025631 A1 | 2/2012 | Shionoiri et al. |
| 2012/0032785 A1 | 2/2012 | Kamata |
| 2012/0062039 A1 | 3/2012 | Kamata et al. |
| 2012/0062174 A1 | 3/2012 | Kamata |
| 2012/0105130 A1 | 5/2012 | Kamata |
| 2012/0133212 A1 | 5/2012 | Kamata |
| 2012/0161529 A1 | 6/2012 | Kamata et al. |
| 2012/0161536 A1 | 6/2012 | Kamata et al. |
| 2012/0161537 A1 | 6/2012 | Kamata |
| 2012/0187771 A1 | 7/2012 | Kamata et al. |
| 2012/0193994 A1 | 8/2012 | Kamata |
| 2012/0223592 A1 | 9/2012 | Kamata |
| 2012/0223593 A1 | 9/2012 | Kamata |
| 2012/0228956 A1 | 9/2012 | Kamata |
| 2012/0262432 A1 | 10/2012 | Kamata et al. |

FOREIGN PATENT DOCUMENTS

| | | |
|---|---|---|
| JP | 2010-068632 A | 3/2010 |
| JP | 2010-141966 A | 6/2010 |
| JP | 2011-029799 | 2/2011 |
| JP | 2011-030294 | 2/2011 |
| JP | 2011-062008 A | 3/2011 |
| JP | 2011-130424 A | 6/2011 |
| JP | 2012-060730 | 3/2012 |
| JP | 2012-060731 | 3/2012 |

\* cited by examiner

POWER RECEIVING DEVICE, POWER TRANSMISSION DEVICE, AND POWER FEEDING SYSTEM

BACKGROUND OF THE INVENTION

1. Field of the Invention

The present invention relates to a power receiving device and a power transmission device. In particular, the present invention relates to a power receiving device and a power transmission device between which power feeding is performed by using magnetic resonance. Further, the present invention relates to a power feeding system including the power receiving device and the power transmission device.

2. Description of the Related Art

A method called a magnetic resonance method attracts attention as a method for feeding electric power to an object (hereinafter, also referred to as a power receiving device) in a state where contact with a power supply source (hereinafter, also referred to as a power transmission device) is not made (such a method is also referred to as contactless power supply, wireless power supply, or the like). The magnetic resonance method is a method for forming an energy propagation path by providing resonator coupling between resonant coils each of which is provided in a power transmission device and a power receiving device. The magnetic resonance method has a longer power transmittable distance than other methods (e.g., an electromagnetic induction method and an electric field induction method). For example, Non Patent Document 1 discloses that in the magnetic resonance method, transmission efficiency is approximately 90% when the distance between a pair of resonant coils is 1 m and that the transmission efficiency is approximately 45% when the distance between the pair of resonant coils is 2 m.

In addition, a power feeding system capable of communicating between a power receiving device and a power transmission device has been developed. For example, Patent Document 1 discloses a power receiving device (power receiving unit) and a power transmission device (power feeding unit) having functions of feeding power with the use of the both of resonant coils (resonant elements) and power receiving (power transmission) coils (driven elements) and of communicating with the use of only the resonant coils. Specifically, the power receiving device and the power transmission device disclosed in Patent Document 1 include switches provided at one end and the other end of the resonant coil and at one end and the other end of the power receiving (power transmission) coil. By controlling switching of the switches by switching controllers, it is selected whether a power feeding function or a communication function is performed.

[Reference]
[Patent Document 1] Japanese Published Patent Application No. 2011-29799
[Non-Patent Document 1] Andre Kurs et al., "Wireless Power Transfer via Strongly Coupled Magnetic Resonances", *Science*, 2007, Vol. 317, pp. 83-86.

SUMMARY OF THE INVENTION

Between the power receiving device and the power transmission device disclosed in Patent Document 1, power feeding is performed by using a magnetic resonance method and communication is performed by an electromagnetic induction method. Note that, as described above, optimal distances between the power receiving device and the power transmission device for these methods are different from each other. Therefore, it is difficult for the power receiving device and the power transmission device disclosed in Patent Document 1 to conduct power feeding and to communicate in pseudo-parallel (successively). For example, it is difficult to set the power feeding condition of the power transmission device based on the condition (such as the impedance) of the power receiving device.

Moreover, it is preferable that a circuit including a resonant coil have a high Q value to increase power feeding efficiency between a power receiving device and a power transmission device. For example, such a circuit preferably includes only a resonant coil and stray capacitance of the resonant coil. Here, in the power receiving device and the power transmission device disclosed in Patent Document 1, a switch is provided at one end and the other end of the resonant coil. In this case, the Q value of the circuit including the resonant coil is decreased owing to the switch. In other words, power feeding efficiency between the power receiving device and the power transmission device disclosed in Patent Document 1 is decreased.

In view of the above, an object of one embodiment of the present invention is to provide a novel power receiving device and a novel power transmission device. Moreover, an object of one embodiment of the present invention is to provide a power receiving device and a power transmission device that can conduct power feeding and communication in pseudo-parallel. Further, an object of one embodiment of the present invention is to provide a power receiving device and a power transmission device having long power transmittable distance and high power feeding efficiency. Note that one embodiment of the present invention aims to achieve at least one of the above objects.

In one embodiment of the present invention, power feeding and communication are performed by using a magnetic resonance method. Specifically, in one embodiment of the present invention, power feeding is performed by generating a second high-frequency voltage based on a first high-frequency voltage induced in a resonant coil and communication is performed by modulating amplitude of the first high-frequency voltage induced in the resonant coil.

For example, one embodiment of the present invention is a power receiving device including a resonant coil in which a first high-frequency voltage that is amplitude-modulated is induced by magnetic resonance; a first unit configured to generate a second high-frequency voltage based on the first high-frequency voltage induced in the resonant coil; a load to which power is supplied using the second high-frequency voltage generated by the first unit; a demodulation circuit configured to demodulate a signal from the second high-frequency voltage generated by the first unit; and a second unit configured to modulate amplitude of the second high-frequency voltage generated by the first unit. In the power receiving device, a response to the signal is given by the second unit.

Note that, a first coil in which a high-frequency voltage is induced by electromagnetic induction with the resonant coil can be used as the first unit and a second coil in which a resistance value between one end and the other end is changeable can be used as the second unit.

Alternatively, a common coil in which a high-frequency voltage is induced by electromagnetic induction with the resonant coil can be used as the first unit and the common coil in which a resistance value between one end and the other end is changeable can be used as the second unit.

In one embodiment of the present invention, power feeding and communication are performed by using a magnetic resonance method. Thus, it is possible to conduct communication and power feeding based on data obtained by the communication in pseudo-parallel. Further, in one embodiment of the present invention, power feeding and communication can be performed without providing a component in contact with a resonant coil in which a high-frequency voltage is induced by magnetic resonance. Thus, it is possible to feed power over a long distance with high power feeding efficiency.

DETAILED DESCRIPTION OF THE INVENTION

Embodiments and an example of the present invention will be described below in detail. Note that the present invention is not limited to the description below, and a variety of changes can be made without departing from the spirit and scope of the present invention. Therefore, the invention should not be construed as being limited to the description below.

(Embodiment 1)

In this embodiment, examples of power receiving devices in one embodiment of the present invention are described with reference to FIG. 1, FIGS. 2A to 2C, and FIGS. 3A and 3B.

(Configuration Example of Power Receiving Device)

Figure 1:
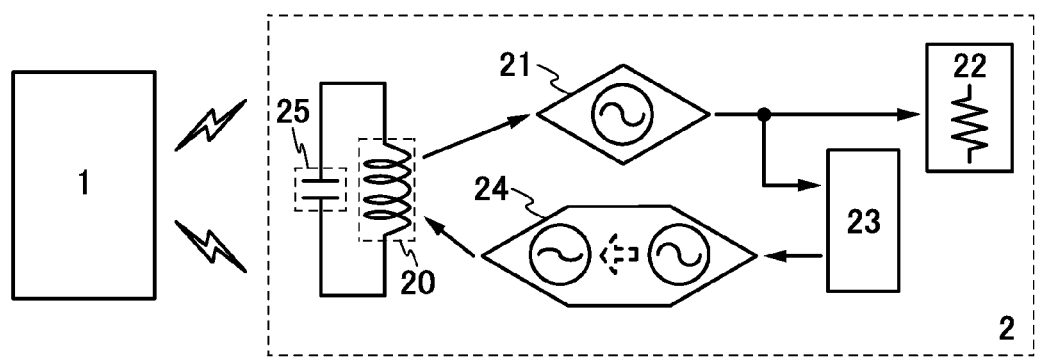
FIG. 1 is a diagram illustrating an example of a configuration of a power feeding system.

FIG. 1 illustrates a configuration example of a power feeding system of one embodiment of the present invention. The power feeding system illustrated in FIG. 1 includes a power transmission device 1 and a power receiving device 2. The power receiving device 2 includes a resonant coil 20 in which an amplitude-modulated high-frequency voltage is induced by magnetic resonance with the power transmission device 1 (resonator-coupling to a resonator included in the power transmission device 1); a unit 21 configured to generate a high-frequency voltage based on the high-frequency voltage induced in the resonant coil 20; a load 22 to which power is supplied using the high-frequency voltage generated by the unit 21; a demodulation circuit 23 configured to demodulate a signal from the high-frequency voltage (amplitude modulation wave) generated by the unit 21; and a unit 24 configured to change amplitude of the high-frequency voltage induced in the resonant coil 20. Note that, in the power feeding system illustrated in FIG. 1, the high-frequency voltage induced in the resonant coil 20 is not necessarily amplitude modulated. That is, the power feeding system may have a structure where an amplitude-modulated high-frequency voltage is induced in the resonant coil 20 as appropriate when communication is performed between the power transmission device 1 and the power receiving device 2. In the case where only power feeding is performed therebetween for example, it is not necessary to conduct the amplitude modulation. Further, in the resonant coil 20, stray capacitance 25 exists between wirings forming the resonant coil 20.

The power receiving device 2 responds to the signal by the unit 24. Specifically, the unit 24 changes amplitude of the high-frequency voltage induced in the resonant coil 20, whereby power received by the power receiving device 2 can be changed. Based on this, a reflected wave of a high-frequency signal which is sent by the power transmission device 1 is changed. The power transmission device 1 detects the reflected wave, which enables the power transmission device 1 to recognize a response from the power receiving device 2.

Note that, as illustrated in FIG. 1, the resonant coil 20 preferably is not directly connected to another component. When another component is directly connected to the resonant coil 20, the series resistance and capacitance of the resonant coil 20 are increased. In this case, a Q value of a circuit including the resonant coil 20 and another component is lower than that of a circuit only including the resonant coil 20. As a result, the structure where the resonant coil 20 is directly connected to another component has lower power feeding efficiency than the structure where the resonant coil 20 is not directly connected to another component.

Moreover, for the unit 21, a coil or the like in which a high-frequency voltage is induced by electromagnetic induction with the resonant coil 20 (magnetic coupling to the resonant coil 20) can be used.

The internal structure of the load 22 is not limited to a certain structure. For example, the load 22 can include an AC-DC converter, a DC-DC converter, a battery, or the like. In particular, the load 22 preferably includes a battery which is charged on the basis of a high-frequency voltage generated by the unit 21. This is because in the case where magnetic resonance is utilized, power can be supplied with high efficiency even in a middle and long distance. The load 22 can also include a matching circuit whose impedance is controlled by the controller. When the impedance of the load 22 is controlled by the controller, power transmission efficiency at the time when the distance between an external power transmission device and the power receiving device is shorter than an optimal distance can be improved, for example.

For the demodulation circuit 23, any circuit may be applied as long as it can identify a signal superposed on a high-frequency voltage by amplitude modulation and can output the signal as a digital signal.

In the case where a coil (first coil) in which a high-frequency voltage is induced by electromagnetic induction with the resonant coil 20 is used for the unit 21, a unit which weakens magnetic coupling between the resonant coil 20 and the first coil can be used for the unit 24, for example. For example, for the unit 24, a coil (second coil) in which a resistance value between one end and the other end is changeable can be provided separately from the first coil.

Note that the first and second coils can be replaced with a single coil. That is, a resistance value between one end and the other end of a coil (common coil) in which a high-frequency voltage is induced by electromagnetic induction with the resonant coil 20 is changed, so that magnetic coupling between the resonant coil 20 and the common coil can be directly weakened. In this case, a coil does not need to be provided additionally, which is preferable. On the other hand, the case where the first and second coils are provided is preferable in that power feeding and responding can be performed in parallel.

In the power receiving device of this embodiment, power receiving and responding are performed by using a magnetic resonance method. Therefore, it is possible to respond to data (the necessity for feeding power, impedance of the load 22, or the like) which contributes to selection of power feeding conditions (the frequency of a high-frequency voltage and the like) in the power transmission device 1 and to receive power based on data obtained by the response in pseudo-parallel. Moreover, in the power receiving device of this embodiment, power receiving and responding can be performed without providing a component directly connected to the resonant coil 20 in which a high-frequency voltage is induced by magnetic resonance. Thus, it is possible to receive power over a long distance with high power receiving efficiency.

(Specific Example 1 of Power Receiving Device)

Figure 2A:
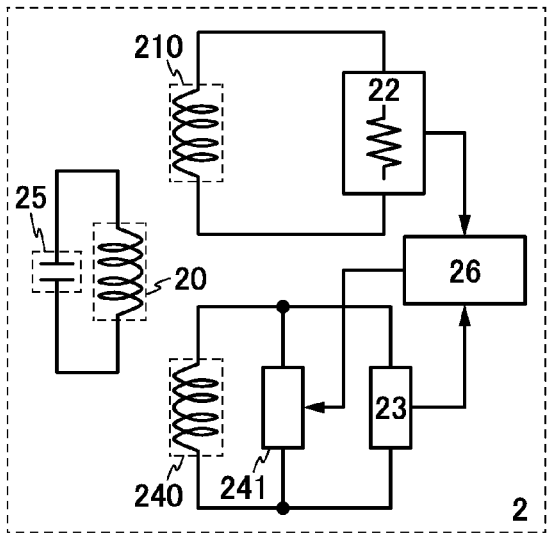
FIGS. 2A and 2B are diagrams each illustrating a specific example of a power receiving device and FIG. 2C is a diagram illustrating a specific example of a variable resistance unit.

FIG. 2A illustrates a specific example of the above-described power receiving device 2. The power receiving device 2 illustrated in FIG. 2A includes a resonant coil 20; a coil (power receiving coil) 210 and a coil (communication coil) 240 in each of which a high-frequency voltage is induced by electromagnetic induction with the resonant coil 20; a load 22 whose one end is electrically connected to one end of the coil 210 and the other end is electrically connected to the other end of the coil 210; a variable resistance unit 241 whose one end is electrically connected to one end of the coil 240 and the other end is electrically connected to the other end of the coil 240; a demodulation circuit 23 configured to demodulate a signal (demodulated signal) from the high-frequency voltage (amplitude modulation wave) induced in the coil 240; and a controller 26 configured to generate a signal (response signal) in response to the demodulated signal. Note that, in FIG. 2A, a structure where the demodulation circuit 23 demodulates a signal from the high-frequency voltage (amplitude modulation wave) induced in the coil 240 is illustrated. However, a structure where the demodulation circuit 23 demodulates a signal from the high-frequency voltage (amplitude modulation wave) induced in the coil 210 can also be employed (see FIG. 2B).

In the power receiving device 2 illustrated in FIG. 2A, a resistance value between one end and the other end of the coil 240 is changed by changing a resistance value of the variable resistance unit 241 based on the response signal. Specifically, as illustrated in FIG. 2C, a structure where a resistor and a switch are connected in series between the one end and the other end of the coil 240 and switching of the switch is controlled based on the response signal may be employed, for example.

(Specific Example 2 of Power Receiving Device)

Figure 2B:
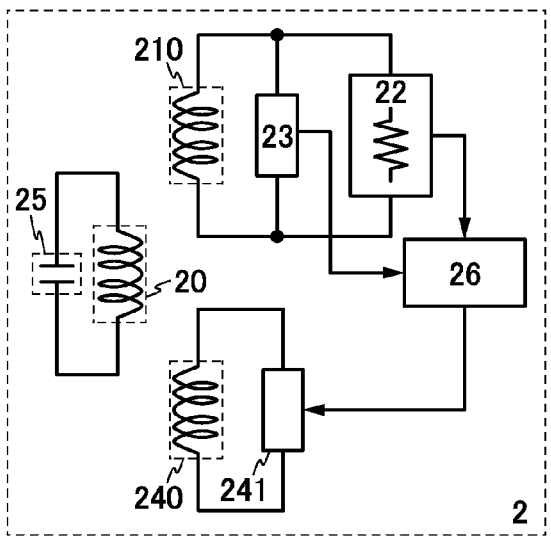
Figure 2C:
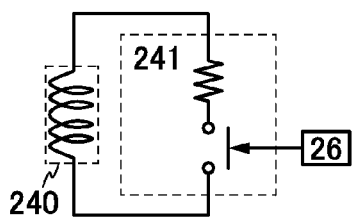
Figure 3A:
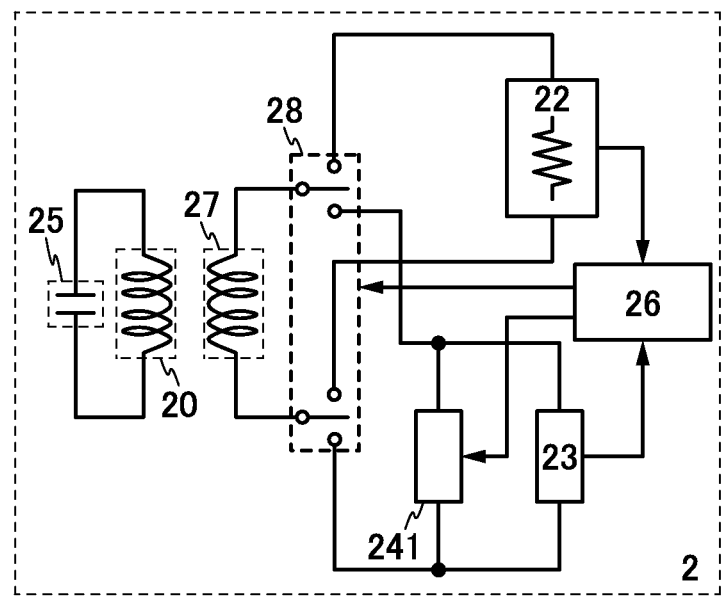
FIGS. 3A and 3B are diagrams each illustrating a specific example of a power receiving device.
Figure 3B:
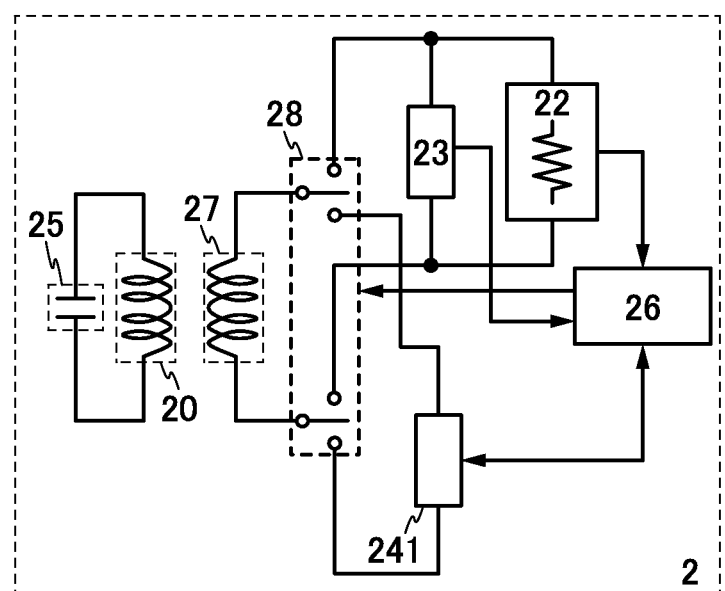

FIG. 3A illustrates a specific example of the power receiving device 2 which is different from those in FIGS. 2A and 2B. The power receiving device 2 illustrated in FIG. 3A includes a resonant coil 20; a coil 27 (power-receiving/communication coil) in which a high-frequency voltage is induced by electromagnetic induction with the resonant coil 20; a load 22; a variable resistance unit 241; a demodulation circuit 23; a controller 26 configured to generate a switching signal for selecting whether to feed power or to respond and a response signal; and a switching unit 28 configured to select whether the coil 27 is electrically connected to the load 22 or to the variable resistance unit 241 and the demodulation circuit 23 based on the switching signal. In short, the power receiving device 2 illustrated in FIG. 3A has a structure where the coils 210 and 240 in the power receiving device 2 illustrated in FIG. 2A are replaced with the coil 27 which is single and the switching unit 28 is additionally provided. Note that, in FIG. 3A, a structure where the demodulation circuit 23 is connected in parallel with the variable resistance unit 241 is illustrated. However, a structure where the demodulation circuit 23 is connected in parallel with the load 22 can also be employed (see FIG. 3B).

In the power receiving device 2 illustrated in FIG. 3A, in a state where the coil 27 is electrically connected to the variable resistance unit 241, a resistance value between one end and the other end of the coil 27 is changed by the variable resistance unit 241 based on the response signal.

(Embodiment 2)

In this embodiment, examples of power transmission devices in one embodiment of the present invention are described with reference to FIG. 4 and FIGS. 5A and 5B.

(Configuration Example of Power Transmitting Device)

Figure 4:
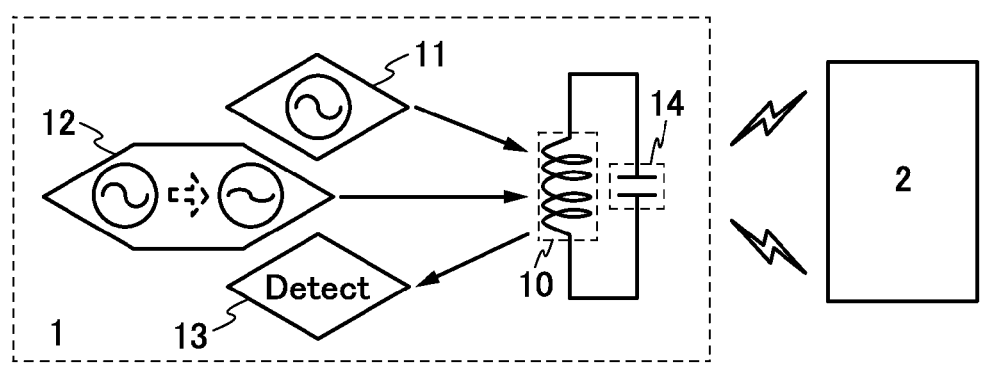
FIG. 4 is a diagram illustrating an example of a configuration of a power feeding system.

FIG. 4 illustrates a configuration example of a power feeding system of one embodiment of the present invention. The power feeding system illustrated in FIG. 4 includes a power transmission device 1 and a power receiving device 2. The power transmission device 1 includes a resonant coil 10 configured to induce a high-frequency voltage in a resonator (resonant coil) included in the power receiving device 2 by magnetic resonance (resonator-coupling to the resonator included in the power receiving device 2); a unit 11 configured to induce a high-frequency voltage in the resonant coil 10; a unit 12 configured to change amplitude of the high-frequency voltage induced in the resonant coil 10; and a unit 13 configured to detect a reflected wave component from the high-frequency voltage induced in the resonant coil 10. Note that, in the resonant coil 10, stray capacitance 14 exists between wirings forming the resonant coil 10.

Note that, as illustrated in FIG. 4, the resonant coil 10 preferably is not directly connected to another component for the same reason described in Embodiment 1.

In addition, as the unit 11, a unit including a coil to which a high-frequency voltage is applied, which result in inducing a high-frequency voltage in the resonant coil 10 by using electromagnetic induction (magnetic coupling to the resonant coil 10), can be employed, for example.

In the case where the unit which induces the high-frequency voltage in the resonant coil 10 by electromagnetic induction with the coil (first coil) is used as the unit 11, a unit which weakens magnetic coupling between the resonant coil 10 and the first coil can be used as the unit 12, for example. For example, as the unit 12, a unit in which a coil (second coil) is provided in addition to the first coil and by which a resistance value between one end and the other end of the second coil is changed can be employed.

In the power transmission device of this embodiment, power feeding and communication are performed using a magnetic resonance method. Therefore, it is possible to conduct communication and power feeding based on data obtained by the communication in pseudo-parallel. Moreover, in the power transmission device of this embodiment, power feeding and communication can be performed without providing the component directly connected to the resonant coil 10 in which a high-frequency voltage is induced by magnetic resonance. Thus, it is possible to feed power over a long distance with high power feeding efficiency.

(Specific Example of Power Transmitting Device)

Figure 5A:
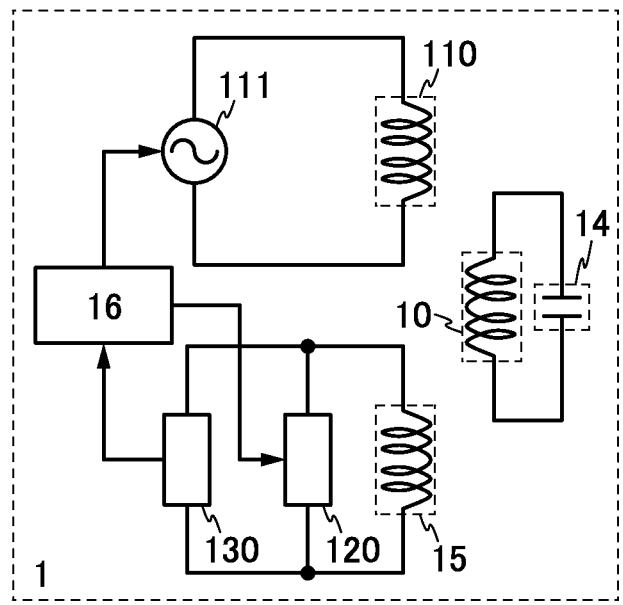
FIGS. 5A and 5B are diagrams each illustrating a specific example of a power transmission device.
Figure 5B:
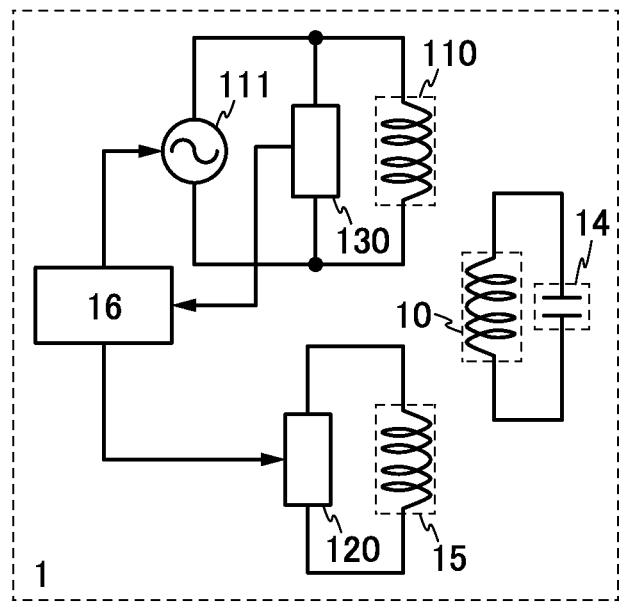

FIG. 5A illustrates a specific example of the above-described power transmission device 1. The power transmission device 1 illustrated in FIG. 5A includes a resonant coil 10; a coil 110 (a power transmission coil) configured to induce a high-frequency voltage in the resonant coil 10 by electromagnetic induction; a high-frequency power source 111 configured to apply a high-frequency voltage to the coil 110; a coil 15 (a communication coil) in which a high-frequency voltage is induced by electromagnetic induction with the resonant coil 10; a variable resistance unit 120 whose one end is electrically connected to one end of the coil 15 and the other end is electrically connected to the other end of the coil 15; a demodulation circuit 130 configured to demodulate a signal (demodulated signal) from the high-frequency voltage induced in the coil 15; and a controller 16 to which the demodulated signal is input and which is configured to control operations of the high-frequency power source 111 and the variable resistance unit 120. Note that, in FIG. 5A, a structure where the demodulation circuit 130 is connected in parallel with the variable resistance unit 120 is illustrated. However, a structure where the demodulation circuit 130 is connected in parallel with the high-frequency power source 111 can also be employed (see FIG. 5B).

Note that the power transmission device of this embodiment and the power receiving device of Embodiment 1 can be combined to form a power feeding system.

EXAMPLE

In this example, applications of the above power feeding system are described. Note that as applications of a power feeding system of one embodiment of the present invention, portable electronic devices such as a digital video camera, a portable information terminal (e.g., a mobile computer, a cellular phone, a portable game machine, or an e-book reader), and an image reproducing device including a recording medium (specifically a digital versatile disc (DVD) reproducing device) can be given. In addition, an electric propulsion moving vehicle that is powered by electric power, such as an electric car, can be given. Examples of such electronic devices are described below with reference to FIGS. 6A and 6B.

Figure 6A:
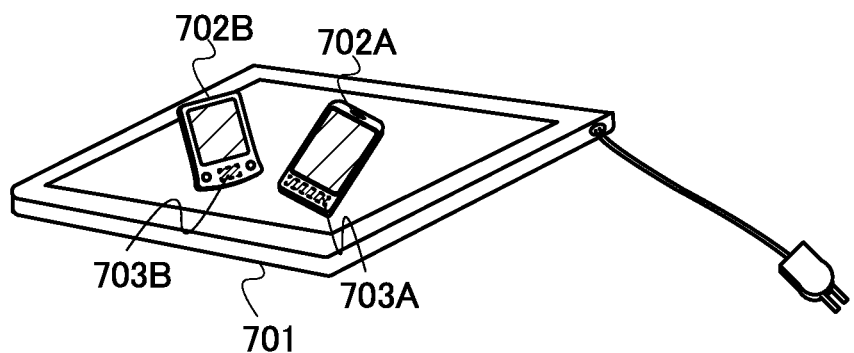
FIGS. 6A and 6B are application examples of power feeding systems.

FIG. 6A illustrates an example of an application of the power feeding system to a cellular phone and a portable information terminal, which includes a power transmission device 701, a cellular phone 702A including a power receiving device 703A, and a cellular phone 702B including a power receiving device 703B. The power transmission device 701 and the power receiving devices 703A and 703B can form the above power feeding system.

Figure 6B:
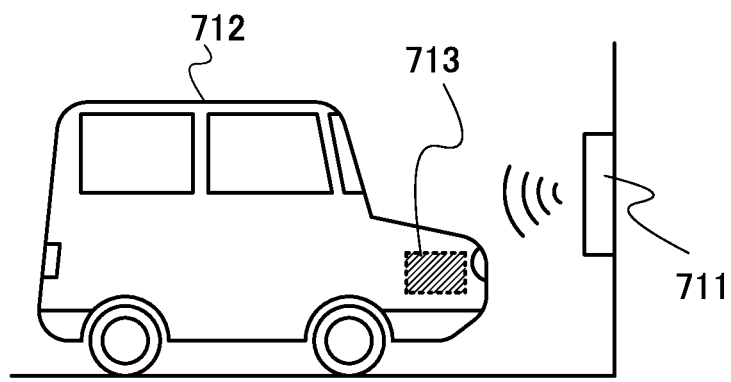

FIG. 6B illustrates an example of an application of the power feeding system to an electric car that is an electric propulsion moving vehicle, which includes a power transmission device 711 and an electric car 712 including a power receiving device 713. The power transmission device 711 and the power receiving device 713 can form the above power feeding system.

This application is based on Japanese Patent Application serial no. 2011-250603 filed with Japan Patent Office on Nov. 16, 2011, the entire contents of which are hereby incorporated by reference.

What is claimed is:

1. A power feeding system comprising:
a power transmission device; and
a power receiving device comprising:
a first resonant coil in which a first high-frequency voltage be induced by magnetic resonance with the power transmission device;
a first unit comprising a first coil, the first coil being adjacent to the first resonant coil to induce a second high-frequency voltage by electromagnetic induction with the first resonant coil;
a load configured to be supplied with electric power using the second high-frequency voltage induced by the first coil;
a first demodulation circuit configured to demodulate a signal from the second high-frequency voltage; and
a second unit configured to receive the signal and to modulate amplitude of the first high-frequency voltage induced in the first resonant coil,
wherein the power receiving device is configured to respond to the signal using the second unit, and
wherein the second unit comprises a second coil in which a resistance value between its first terminal and its second terminal is changeable.

2. The power feeding system according to claim 1, wherein a resistance value of the first coil between its first terminal and its second terminal is changeable.

3. The power feeding system according to claim 1, further comprising a capacitance electrically connected to the first resonant coil.

4. The power feeding system according to claim 1, wherein the load includes at least one of an AC-DC converter, a DC-DC converter, a battery, and a matching circuit.

5. The power feeding system according to claim 1, wherein the first high-frequency voltage induced in the first resonant coil is amplitude-modulated.

6. The power feeding system according to claim 1, the power transmission device comprises:
a second resonant coil;
a power transmission coil, the power transmission coil configured to induce a third high-frequency voltage in the second resonant coil by electromagnetic induction;
a high-frequency power source configured to apply a fourth high-frequency voltage to the power transmission coil;
a communication coil in which a fifth high-frequency voltage is induced by electromagnetic induction with the second resonant coil;
a variable resistance unit including a first terminal electrically connected to a first terminal of the communication coil and a second terminal electrically connected to a second terminal of the communication coil;
a second demodulation circuit electrically connected to one of the power transmission coil and the communication coil; and
a controller configured to control operations of the high-frequency power source and the variable resistance unit.

7. The power feeding system according to claim 1, the power transmission device comprises:
a second resonant coil;
a third unit configured to induce a high-frequency voltage in the second resonant coil;
a fourth unit configured to change amplitude of the high-frequency voltage induced in the second resonant coil; and
a fifth unit configured to detect a reflected wave component from the high-frequency voltage induced in the second resonant coil.

8. A power feeding system comprising:
a power transmission device; and
a power receiving device comprising:
a first resonant coil in which a first high-frequency voltage is induced by magnetic resonance with the power transmission device;

a power-receiving/communication coil being adjacent to the first resonant coil to induce a second high-frequency voltage by electromagnetic induction with the first resonant coil;

a switching unit including a first terminal being capable of electrically connecting to a first terminal of the power-receiving/communication coil and a second terminal being capable of electrically connecting to a second terminal of the power-receiving/communication coil;

a load including a first terminal being capable of electrically connecting to the first terminal of the switching unit and a second terminal being capable of electrically connecting to the second terminal of the switching unit;

a first variable resistance unit including a first terminal being capable of electrically connecting to the first terminal of the switching unit and a second terminal being capable of electrically connecting to the second terminal of the switching unit;

a first demodulation circuit configured to demodulate a signal from the second high-frequency voltage induced in the power-receiving/communication coil, the first demodulation circuit including a first terminal being capable of electrically connecting to the first terminal of the switching unit and a second terminal being capable of electrically connecting to the second terminal of the switching unit; and a first controller configured to generate a switching signal for selecting to receive power or to respond and a response signal in response to the signal, wherein in a state where the power-receiving/communication coil is electrically connected to the first variable resistance unit, a resistance value between the first terminal and the second terminal of the power-receiving/communication coil is changed by the first variable resistance unit based on the response signal.

9. The power feeding system according to claim 8, further comprising a capacitance electrically connected to the first resonant coil.

10. The power feeding system according to claim 8, wherein the load includes at least one of an AC-DC converter, a DC-DC converter, a battery, and a matching circuit.

11. The power feeding system according to claim 8, wherein the first high-frequency voltage induced in the first resonant coil is amplitude-modulated.

12. The power feeding system according to claim 8, the power transmission device comprises:

a second resonant coil;

a power transmission coil, the power transmission coil configured to induce a third high-frequency voltage in the second resonant coil by electromagnetic induction;

a high-frequency power source configured to apply a fourth high-frequency voltage to the power transmission coil;

a communication coil in which a fifth high-frequency voltage is induced by electromagnetic induction with the second resonant coil;

a second variable resistance unit including a first terminal electrically connected to a first terminal of the communication coil and a second terminal electrically connected to a second terminal of the communication coil;

a second demodulation circuit electrically connected to one of the power transmission coil and the communication coil; and a second controller configured to control operations of the high-frequency power source and the second variable resistance unit.

13. The power feeding system according to claim 8, the power transmission device comprises:

a second resonant coil;

a first unit configured to induce a high-frequency voltage in the second resonant coil;

a second unit configured to change amplitude of the high-frequency voltage induced in the second resonant coil; and a third unit configured to detect a reflected wave component from the high-frequency voltage induced in the second resonant coil.

* * * * *